(12) United States Patent
Hunka

(10) Patent No.: US 9,970,418 B2
(45) Date of Patent: May 15, 2018

(54) SOLAR ENERGY CONVERSION SYSTEM

(75) Inventor: Robert Hunka, Oakland, CA (US)

(73) Assignee: Robert Hunka, Oakland, CA (US)

( * ) Notice: Subject to any disclaimer, the term of this patent is extended or adjusted under 35 U.S.C. 154(b) by 685 days.

(21) Appl. No.: 13/230,835

(22) Filed: Sep. 12, 2011

(65) Prior Publication Data
US 2012/0235411 A1  Sep. 20, 2012

Related U.S. Application Data

(60) Provisional application No. 61/403,153, filed on Sep. 10, 2010.

(51) Int. Cl.
| | |
|---|---|
| *F03G 6/04* | (2006.01) |
| *F01D 15/10* | (2006.01) |
| *F24J 2/34* | (2006.01) |
| *F03D 9/00* | (2016.01) |
| *F24J 2/28* | (2006.01) |
| *F24J 2/42* | (2006.01) |
| *F03D 9/18* | (2016.01) |

(52) U.S. Cl.
CPC ............ *F03D 9/007* (2013.01); *F03D 9/18* (2016.05); *F24J 2/28* (2013.01); *F24J 2/34* (2013.01); *F24J 2/42* (2013.01); *F05B 2240/40* (2013.01); *F05B 2250/283* (2013.01); *Y02E 10/44* (2013.01); *Y02E 10/465* (2013.01); *Y02E 10/72* (2013.01)

(58) Field of Classification Search
CPC ............................... F03G 6/045; Y02E 10/465
USPC ............... 60/641.2, 641.8, 641.15, 641.12; 123/569, 652, 655, 684, 698; 237/1 R
See application file for complete search history.

(56) References Cited

U.S. PATENT DOCUMENTS

| | | | | | |
|---|---|---|---|---|---|
| 3,841,738 | A | * | 10/1974 | Caplan | B32B 37/146 |
| | | | | | 126/684 |
| 4,092,979 | A | * | 6/1978 | Kotlarz | F24J 2/06 |
| | | | | | 126/628 |
| 4,129,117 | A | * | 12/1978 | Harvey | F24J 2/202 |
| | | | | | 126/655 |
| 4,249,516 | A | * | 2/1981 | Stark | F24J 2/067 |
| | | | | | 126/601 |

(Continued)

FOREIGN PATENT DOCUMENTS

| | | | | |
|---|---|---|---|---|
| EP | 1589221 A2 | * | 10/2005 | ............... F03D 1/04 |
| FR | 2877058 A1 | * | 4/2006 | ............. F03D 9/007 |
| WO | WO 2009005842 A1 | * | 1/2009 | ............. F03D 9/007 |

*Primary Examiner* — Mark Laurenzi
*Assistant Examiner* — Mickey France

(57) ABSTRACT

A novel cost effective low profile structure that converts and stores solar radiation into heat and electricity for controlled utilization. The inventive material incorporates a large insulated vault or chamber of substantial thermal mass connected to a series of inlet passages and to a solar collector assembly. As solar radiation is collected by the solar collector assembly a temperature gradient is created between the collector and the air that is within the vault resulting in air being drawn out of the chamber and through the collector assembly. This air movement is utilized to rotate turbines that are coupled to the inlet passages generating electricity. The hot air is also captured and utilized. The system provides for an efficient, economical process of harnessing and utilizing solar energy by capitalizing on not only on its thermal nature, but its motive nature as well.

15 Claims, 10 Drawing Sheets

(56) References Cited

U.S. PATENT DOCUMENTS

| | | | | |
|---|---|---|---|---|
| 4,275,309 | A * | 6/1981 | Lucier | F03D 1/04 290/1 R |
| 4,359,870 | A * | 11/1982 | Holton, Sr. | F03G 6/045 60/641.12 |
| 4,452,046 | A * | 6/1984 | Valentin | F03D 1/04 290/55 |
| 4,481,774 | A * | 11/1984 | Snook | F03D 1/04 60/398 |
| 4,556,047 | A * | 12/1985 | Clavier | F24J 2/02 126/400 |
| 5,284,628 | A * | 2/1994 | Prueitt | B01D 47/06 261/116 |
| 6,532,740 | B1 * | 3/2003 | Sullivan | F03D 1/04 60/641.11 |
| 6,598,601 | B2 * | 7/2003 | Schutz | F24J 2/055 126/651 |
| 7,013,887 | B2 * | 3/2006 | Kuckelkorn | F24J 2/055 126/652 |
| 2003/0061773 | A1 * | 4/2003 | O'Leary | F24J 2/0444 52/173.3 |
| 2004/0187917 | A1 * | 9/2004 | Pichler | G02F 1/155 136/263 |
| 2006/0156725 | A1 * | 7/2006 | Kenessey | F03D 1/04 60/641.12 |
| 2008/0216822 | A1 * | 9/2008 | Lazzara | F01K 3/00 126/617 |
| 2010/0012112 | A1 * | 1/2010 | Le Lievre | F24J 2/07 126/600 |
| 2012/0060500 | A1 * | 3/2012 | Nicolaescu | F24J 2/20 60/641.8 |

\* cited by examiner

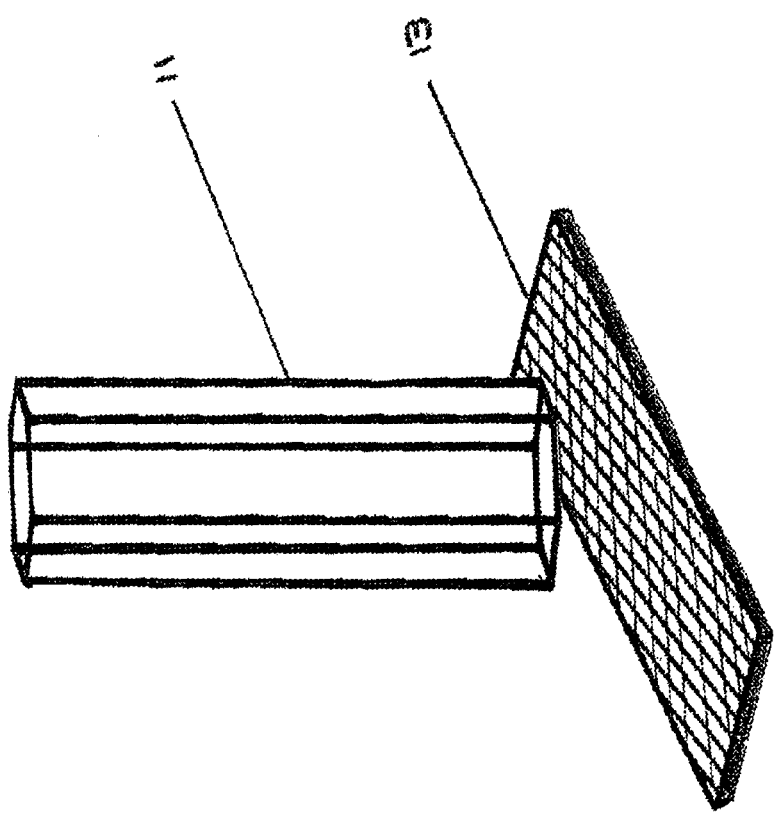

SOLAR ENERGY CONVERSION SYSTEM

PRIORITY FILING

This application is claiming the filing date of Sep. 10, 2010 of provisional patent application Ser. No. 61/403,153.

BACKGROUND OF THE INVENTION

Field of Invention

The invention relates to solar energy conversion, specifically to an improved solar energy conversion and storage system utilizing ambient air.

Related Art

There are many modes and methods of generating and utilizing the energy of the sun utilizing the buoyant nature of heated gases. Most common prior art for producing electrical power required a large, relatively flat solar collection area coupled to an elongated cylindrical or chimney-like structure. Air movement would flow horizontally then change direction upward and out through a single, tall chimney which would then be coupled to a turbine or the like to generate electricity. The disadvantage of this is that the earlier structures for converting solar energy into the movement of air lose efficiency in each of their main components of their design. Solar energy absorption and energy transfer to air loses efficiency because some heat energy is transferred to areas that cannot subsequently heat the gas.

Furthermore, materials used in the solar collection area in prior art are subject to deterioration over time and needed to be designed for high energy transmission and high thermal insulating characteristics to prevent energy from escaping to the ambient environment. These factors reduce the collection efficiency and can deteriorate considerably over the life expectancy of the structure. The efficiency of the usable energy transfer is, typically less than fifty percent. Because the solar collection area of prior art is relatively flat, that area can collect dirt, sand, and debris as well as become graded by abrasion which blocks a percentage of the incident solar energy from heating the gas, leading to a degradation in efficiency of energy conversion.

The chimney structure of prior art's flow passage creates resistance to fluid flow due to constriction, turbulence, flow loss factors associated with change in direction and inlet and outlet conditions, and surface friction effects. The design of the output extraction device in prior art is restricted by the physical limitations of being located within the solar collection or vertical airflow structures. Additionally these devices are subject to high temperatures as they harness energy from the escaping hot gassed which may adversely affect their service life. The output efficiency of the prior art is a function of the height of centrally located tall structure(s). The cost of the output produced goes up exponentially with height. This increasing construction cost vs. output ratio significantly affects the payback on cost of construction There has been a need for a solar energy conversion and storage system that is cost effective, simple, easily upgradable and essentially self cleaning.

BRIEF SUMMARY

The invention provides for, according to one general embodiment, a novel cost effective structure for the conversion and storage of solar radiation into heat and electricity for controlled utilization. The inventive material incorporates a large vault or chamber of substantial thermal mass that is insulated which is connected to a solar collector assembly, which approximates a series of relatively short hollow tubes that are tangentially connected to each other, but allow the free flow of air through their centers. The chamber is sealed with the exception of a series of inlet passages and the solar collector assembly. As solar radiation is collected by the solar collector assembly a temperature gradient is created between the collector and the air that is within the vault resulting in air being drawn out of the chamber and through the collector assembly. This pressure drop in turn initiates air flow through the inlet passage.

This air movement is utilized to rotate low pressure turbines that are coupled to the inlet passages which intern generate electricity or create rotational energy. The exiting air can be captured and used for a myriad of purposes such as to heat structures or buildings for example.

Furthermore, due to the component nature of the invention, it is linearly scalable to power produced and it is anticipated that the cost per energy unit output would decrease as the structure increases due to discounts of quantity of scale.

The instant invention provides for an efficient, economical process of harnessing and utilizing solar energy by heating gas such as air and by capitalizing on, not only, its thermal nature, but its motive nature as well. This energy can be used in many fashions such as to generate electrical power created through turbines driven by airflow, for the drying of agricultural products, and for the condensation to potable water from a variety of processes, such as the drying of agricultural products, the evaporation of polluted water or from distilling the humidity in ambient air in high humidity locations Furthermore, the latent heat released during condensation can supplement or replace the heat generated by solar energy. Removal of undesired liquids from industrial goods, either solid or porous, through evaporation and optional condensation as well as sequestration of objectionable fumes or pollution from liquids can also be achieved with the energy generated and can be incorporated into the invention.

Although, the terms, air and heated gases will be used extensively throughout this application it is readily understandable that the principles described can be applied a variety of gaseous materials, such as water vapor, gas mixtures, or a combinations of them, as well as the myriad of uses of the movement of gasses. Such as, but not limited to the operation of turbines high pressure or low pressure to generate electricity, drying agricultural products such as tobacco, the distilling of volatile gases from mixtures or fluids and the sequestering of undesirable gases, such as carbon dioxide.

Other aspects and advantages of the present invention will become apparent from the following detailed description which when taken in conjunction with the drawings, illustrates by way of example the principles and structure of the invention.

BRIEF DESCRIPTION OF THE DRAWINGS

Taking the following specifications in conjunction with the accompanying drawings will cause the invention to be better understood regarding these and other features and advantages. The specifications reference the annexed drawings wherein:

FIG. 3a is a perspective view of an element of a solar collection assembly of a solar energy conversion system.

DETAILED DESCRIPTION OF THE PREFERRED EMBODIMENTS

Figure 1:
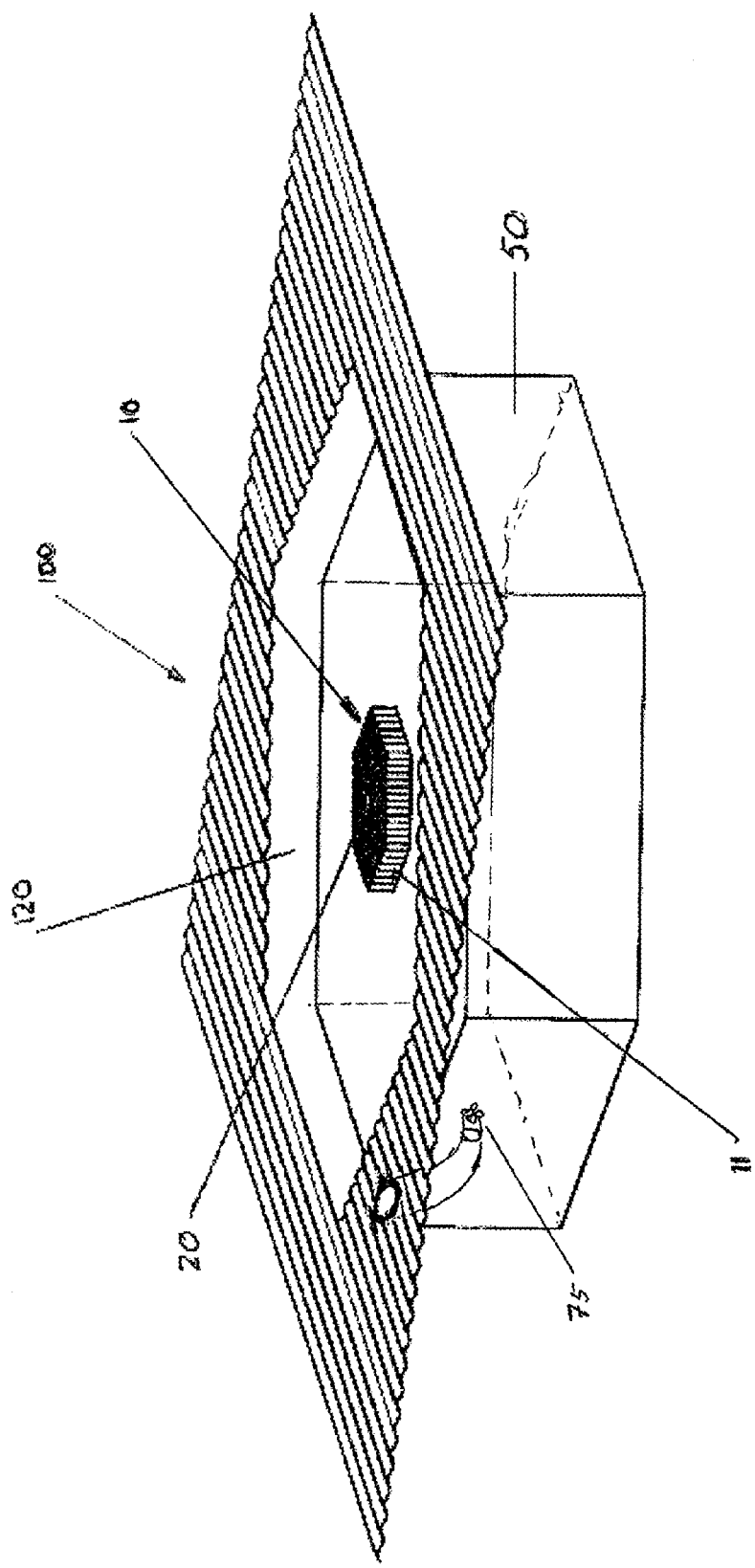
FIG. 1 is a perspective view of a low profile solar energy conversion system.

While describing the invention and its embodiments, various terms will be used for the sake of clarity. These terms are intended to not only include the recited embodiments, but also all equivalents that perform substantially the same function, in substantially the same manner to achieve the same result.

Now referring to FIG. I which discloses a preferred embodiment of the present invention, a low profile solar energy converter and storage system, generally reference by the numeral 100 for the use of capturing and converting solar energy into heat, electricity or rotational energy. The solar energy converter 100 comprises an insulated vault 50, at least one air passage inlets 20 or 30, a heat storage chamber 120, and a solar collector generally referenced by the numeral 10 which is represented in an exploded view in FIG. 3.

The system incorporates three main structures to produce a number of outputs driven by the flow of a gas. A first structural group is a solar energy collector 10 allowing solids and/or liquids to absorb solar energy and transfer that heat energy to a gas by convection. A second main structural group is a vault 50 to allow the flow of a gas into the solar energy collector 10
A third main structural group is arc passagcv,ays an air passage 20 and 30 that feed into the vault 50 and incorporate devices for extracting the end product (such as, electrical power, removal of unwanted gases, drying condensation) from the movement of gas generated by the complete system.

The three structures described above, each designed to optimize their individual efficiency, thereby creating an overall highly efficient means of converting solar energy into the specified output using the movement of the heated gas. The structures are efficiently scaled to increase the systems output because construction cost are relatively small. The velocity and volume of gas flow through the output extraction structures can be easily controlled by the changing of the ratio of the total inflow area to outflow area to optimize the specified output.

Figure 2:
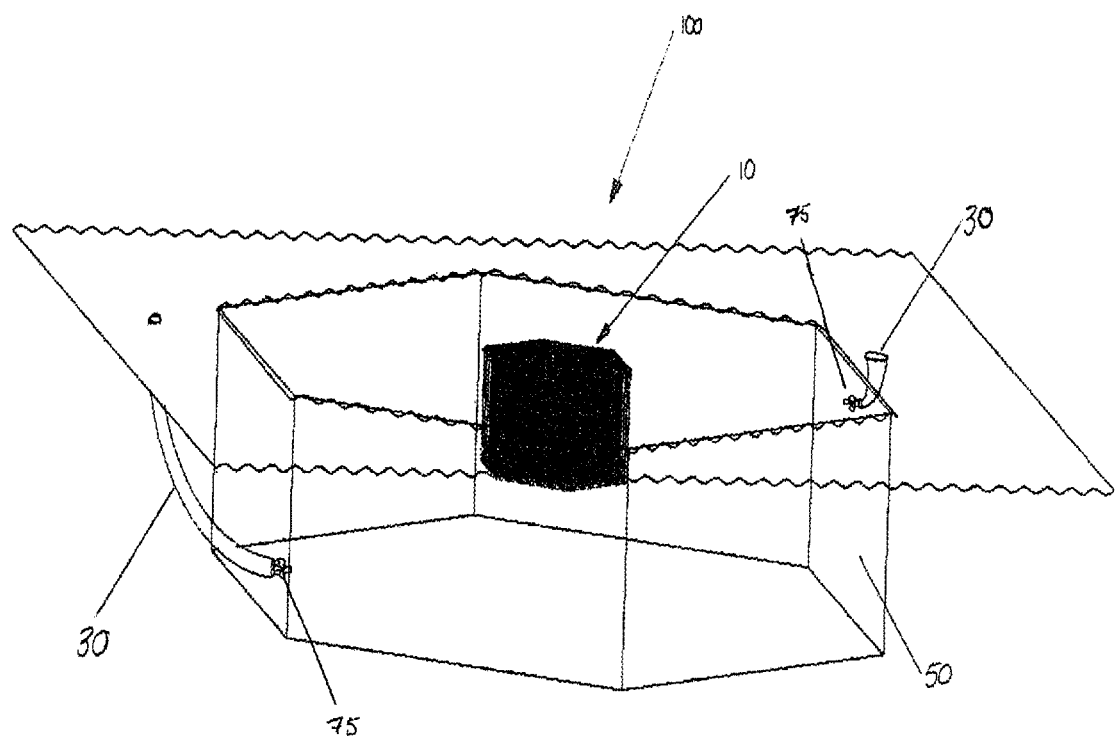
FIG. 2 is a perspective transparent view of a low profile solar energy conversion system.

Now referring to FIG. 2 a transparent view of an embodiment of the solar energy conversion system analogous to FIG. I with a slightly different configuration of the inlet passageways 30 wherein they are connected to and through the walls of the vault 50 to create different flow patterns of the incoming gas, not only by their location in the structure, but also by various geometries, from a substantially uniform internal diameter to a tapered, horn-like structure, compatible to the flow requirements, whether turbulent or laminar for example. Additionally this embodiment does not utilize a heated air storage vault, but rather allows the heated gassed from the energy collection area 10 to be released into the atmosphere.

Figure 3:
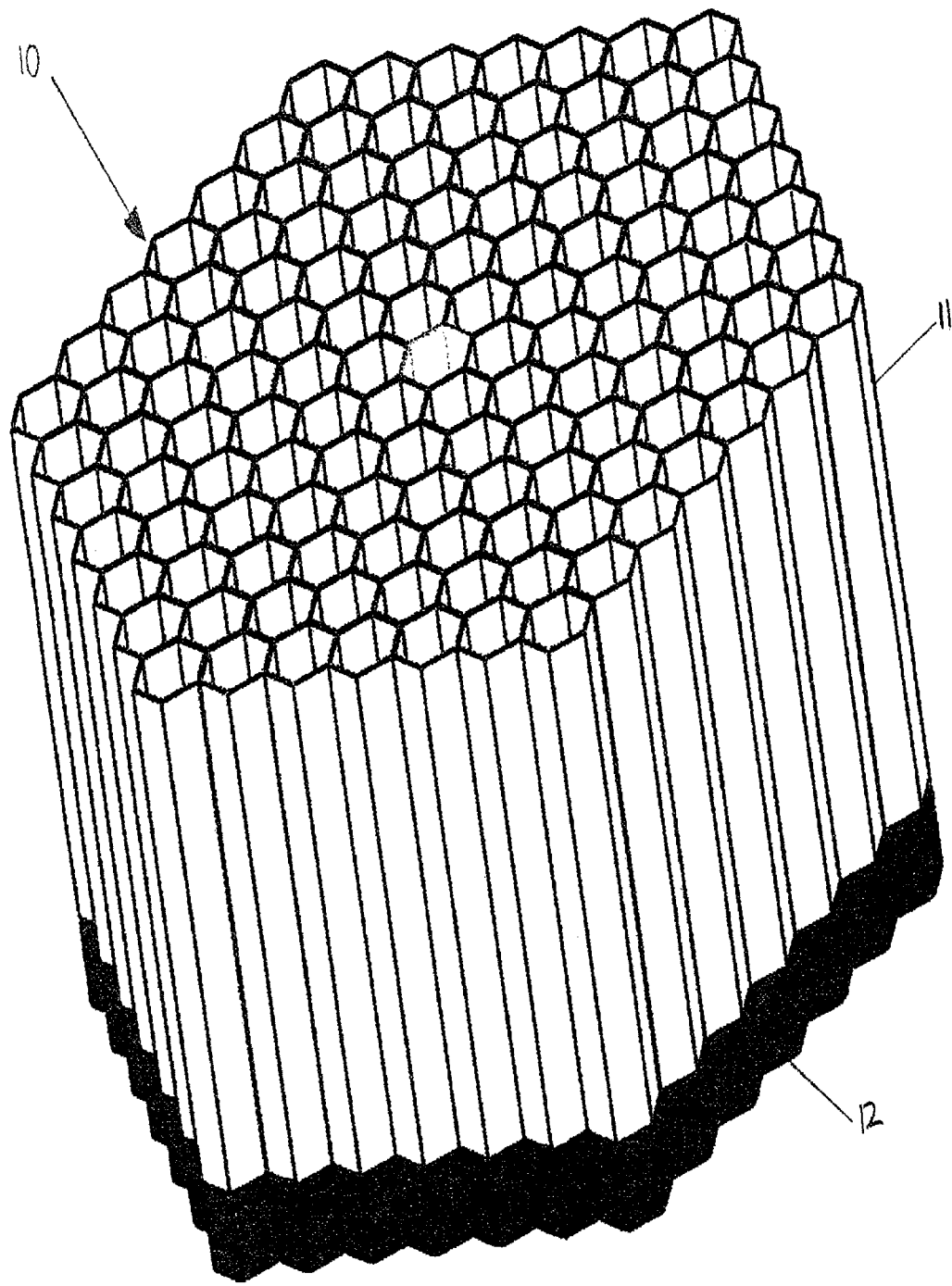
FIG. 3 is a perspective view of a solar collection assembly of a solar energy conversion system.

Now referring to FIG. 3 and FIG. 3a, a perspective view of a solar energy collector 10 and an individual solar collector respectively. The solar energy collector solar collection assembly IO is fabricated from a plurality of flow passages that are comprised of a top section 11 and a bottom section 12 that are oriented vertical and so enable a "self cleansing" process to function where pollutants run off them via gravity. In one embodiment the top and bottom sections 11 and 12 respectively are hollow tubular segments or sections of pipes that are connected end to end to form a single operatively connected tubular element continuous structure. It has been contemplated to utilize a variety of geometries such as circular piping, rectangular tubing or hexagonal tubing or combination of these so that they are close coupled or tangentially attached to allow high contact heat transfer between the elements through conductive heat transfer. The tubing's' diameter and locations are distributed and balanced to perform a desired control of the buoyancy effects of the rising gas over the collection area. In one embodiment hexagonal tubing is depicted in the FIG. 3 and the solar energy collector 10 resembles an extruded beehive, providing for the optimal tangential or circumferential contact between each of the sections 11, 12. The cross section area and height are optimized for buoyancy of the heated gas flowing through the interior opening, material cost, ease of construction, and ease of servicing. In a preferred embodiment the collector is wider that it is tall. The individual segments top and bottom section 11,12 can be lightweight hollow tubes stacked together, or preassembled hollow tubular segments fastened together to form the flow passages.

It has further been contemplated to utilize a support grid (not shown) for the solar collector area solar energy collector 10, designed with minimum flow resistance incorporated into chamber 10 below would essentially be vertical tubes posts attached thereto.

In the preferred embodiment the top section of the each vertical tube is transparent to allow nearly all of the solar energy to pass through with virtually no reflection or absorption. Materials such as glass, ceramics, plastics, or reflective coatings have been contemplated to achieve this transparency. The lower section 12 of each individual tube comprises of a material that absorb nearly all of the solar radiation independent of the angle of inclination of the solar energy input, materials with a high thermal mass have been contemplated, such as various metals, materials covered with a radiation absorbent material or paint, or a combination of these.

In an alternate embodiment FIG. 3a, it has been contemplated to utilize the transparent upper section 11 in combination with a lower radiation absorbent plate 13 to capture the solar radiation.

In one embodiment it has been contemplated that the bottom section 12 and energy absorbing plates 13 are composed of compounds incorporating nano-materials, or coated with compounds incorporating nano-materials which maximize energy absorption and heating while minimizing reflection. Optimum efficiency is achieved by minimizing the ratio of the perimeter to solar absorption area.

Figure 3B:
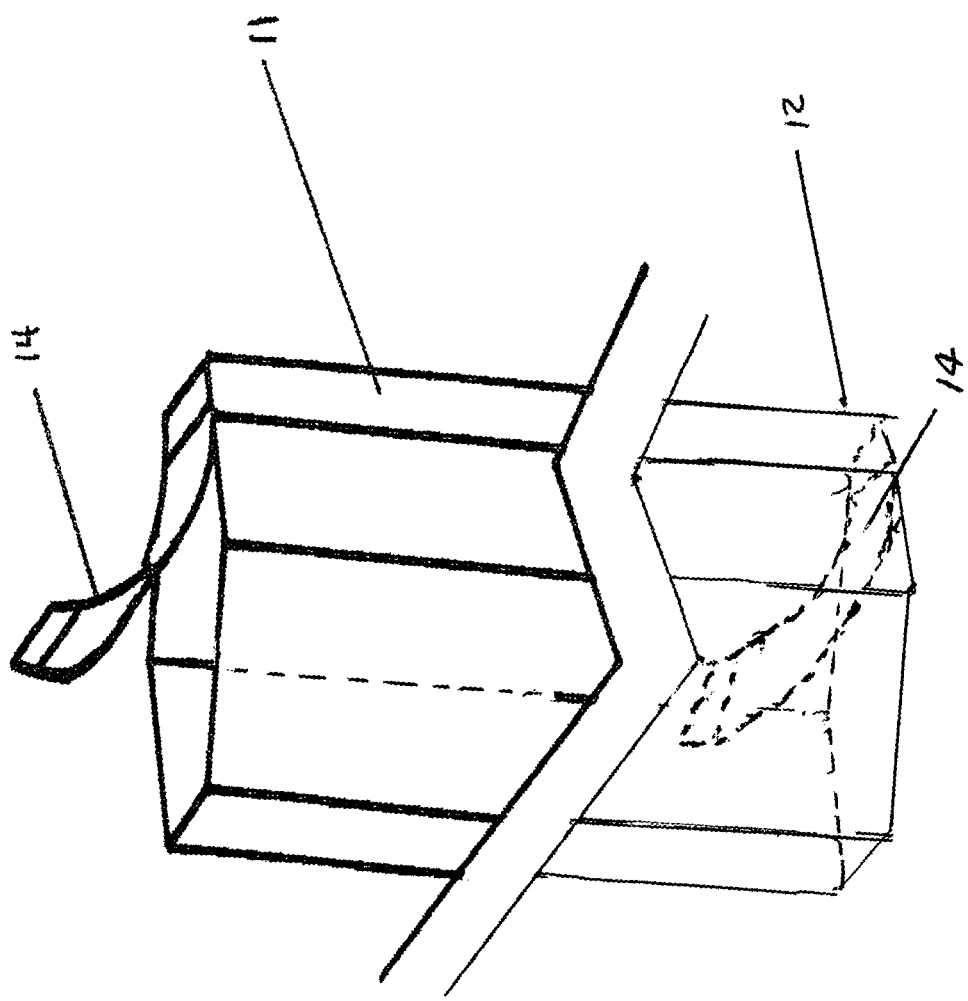
FIG. 3b is a perspective view of an element of a solar collection assembly of a solar energy conversion system.

Referring to FIG. 3b, a perspective view of an element of a solar collection assembly of a solar energy conversion system in combination with FIGS. 2 and 3, the upper opening of each flow passage upper top section 11 operatively feeds to ambient conditions while the bottom section 12 is operatively fed by the vault 50 and so in some applications in order to prevent reverse downward flow a check valve 14 is mounted within each tube allowing, relatively, unrestricted flow upwards and prevents reverse flow in cases of thermal imbalance between tubes: It is preferred to locate the check valve 14 at the bottom of the tube to eliminate blockage of the solar energy absorbing bottom section 12 from solar radiation. In one embodiment these check valves 14 are gravity operated, so that escaping gas from the top section 11 will lift them allowing gas to escape, deflecting ambient wind upward to increase the upward air flow through the individual vertical segments by induction aerodynamic effects. It has also been contemplated that the deflectors be dynamically rotational to adjust their position to follow the variable wind direction. When the pressure drops the check valves 14 lay flat and seal the sides of the tube tube The check valve 14 acts a diffuser, angled deflector, or diverter from cross currents across the solar energy collector 10.

In alternative embodiments it has been contemplated that the valves 14 be mechanically, electrically or thermally operated, such as a bi-metallic flap.

In an alternative embodiment baffles and plates are incorporated within the chamber to produce a "balanced" flow through the solar collection area. These plates/baffles also serve as solar energy absorption material to compliment or replace any solar energy adsorption in the vertical flow FIG. 3d. FIG. 3e, FIG. 3f. and FIG. 3e depict alternate construction techniques for creating a solar energy collector 10 by building annular rings and adding wall segments within the rings to create the cross sectional area and height to optimize solar energy collection and heat transfer to air within the segments. Similar to the tube approach, the structure incorporates a bottom section 12 for solar energy absorption and a top section 12 to increase the buoyancy effective negative pressure draw. The segment design would replace the tubular design of solar air collector 10. It would be integrated with with structural components (not shown) vault 50. air passage inlet 20, inlet passageway 30, check valves 14. Heat storage chamber 120. energy absorbing plates 13. output generating device 75. Applications include basic output generating function and incorporating into a building system for HV AC operation.

Optionally, energy could be stored in the heat absorbing solid material ground or liquid "pond" located within the vault 50. Any area within the vault 50 collection chamber can store thermal energy and allow for release over time when the sun is no longer heating the area directly. The flow chamber vault 50 is sealed to only allow outflow to the solar energy collector 10 and in flow from inlet passageways 30.

Figure 3C:
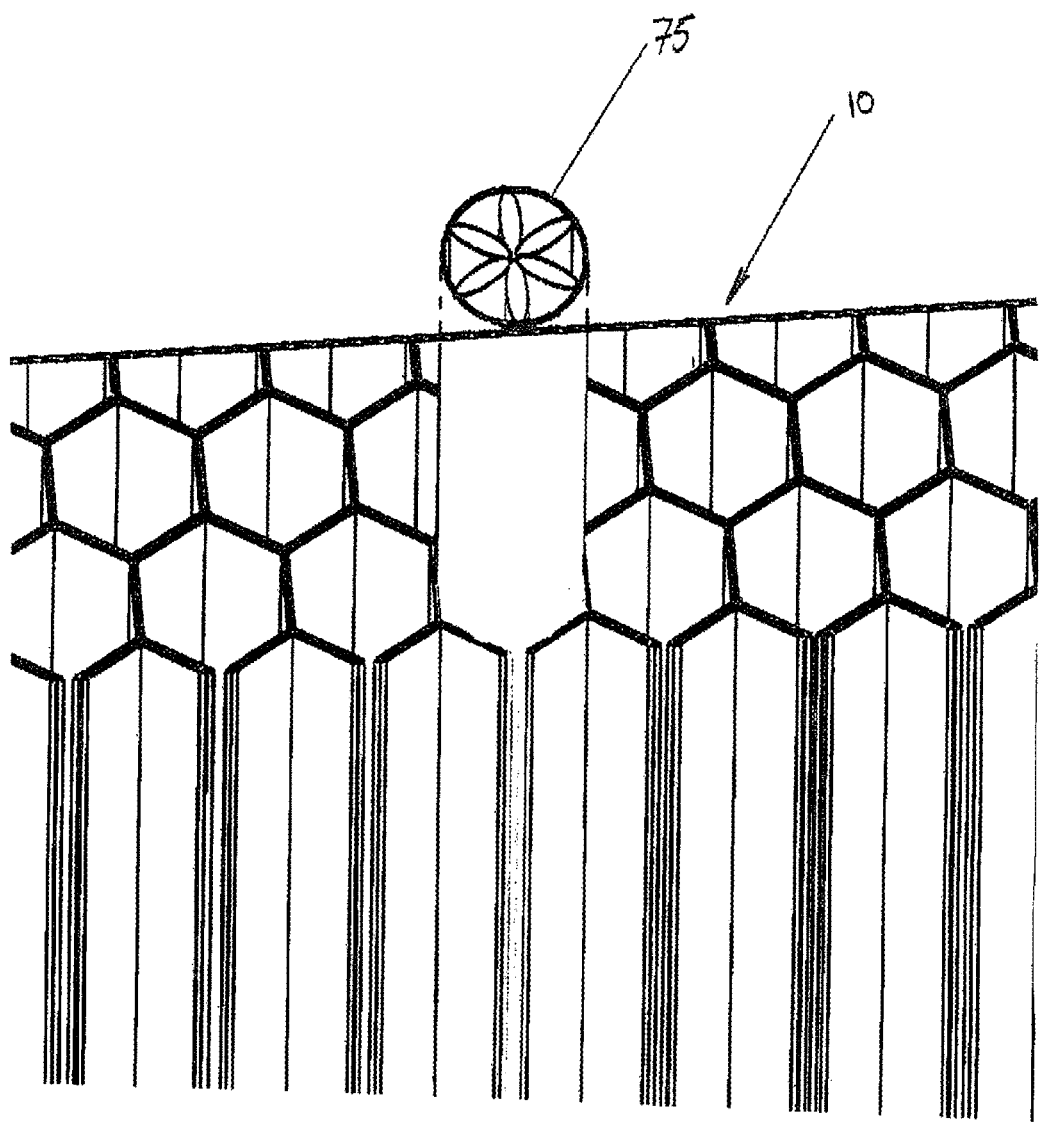
FIG. 3c is a perspective view of an array of element of a solar collection assembly of a solar energy conversion system
Figure 3D:
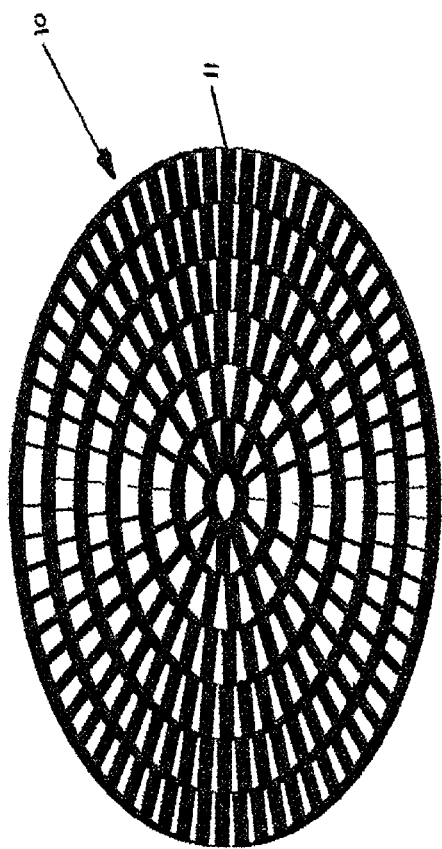
FIG. 3d is a perspective view of a solar collection assembly of a solar energy conversion system.
Figure 3E:
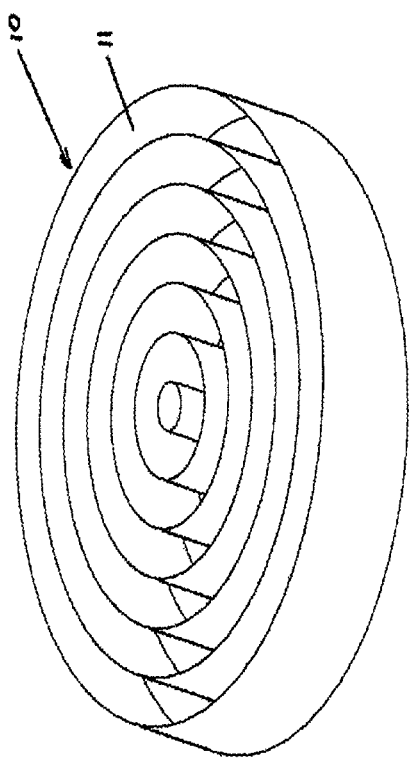
FIG. 3e is a perspective view of a solar collection assembly of a solar energy conversion system.
Figure 3F:
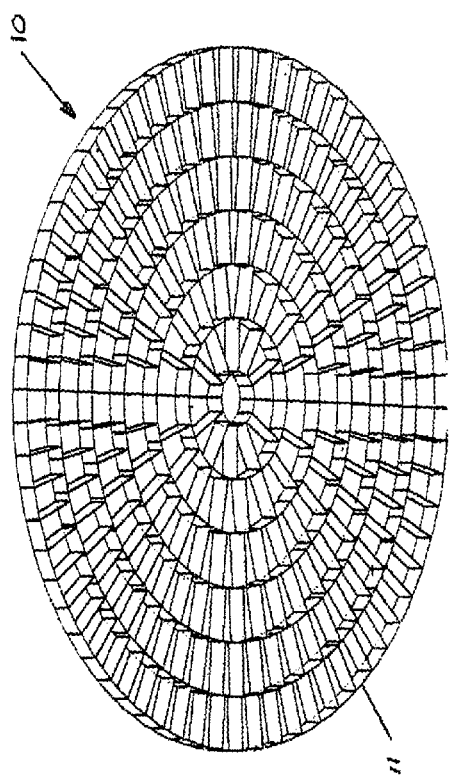
FIG. 3f is a perspective view of a solar collection assembly of a solar energy conversion system.
Figure 3G:
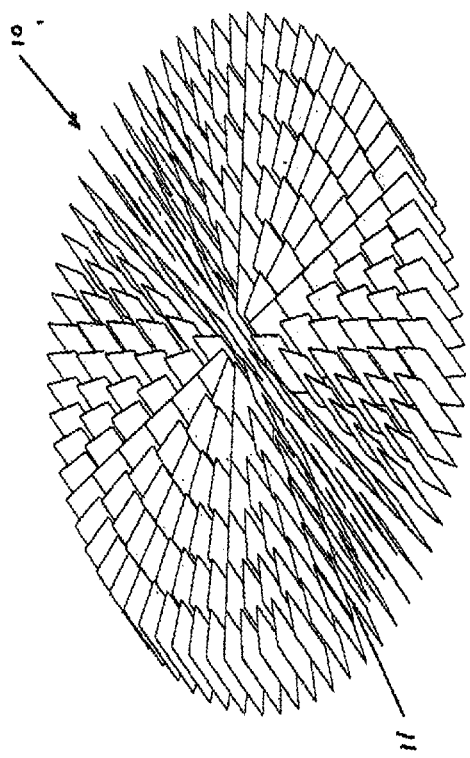
FIG. 3g is a perspective view of a solar collection assembly of a solar energy conversion system.

Now referring to FIG. 1,2; 3 and FIG. 3c, a partial section a of solar collector. IO incorporating an output producing device 75. FIG. 2 and FIG. 3 incorporates inlet passageways 30 which are operatively connected the sides. bottom and top of the vault 50. These inlet passageways are combined with output producing devices 75b produce additional desired output. In t.lis one instance a turbine is located in passageways 20, feeding the flow chamber vault 50. These power producing devices 75 include, but are not limited to, turbines, electric generators, flywheels and others. The size and location is optimized for maximum efficiency between the input feed under ambient conditions and the discharge into the flow chamber.

The solar energy conversion system can be built on a flat plane; on a hillside; floating on a liquid; above, flush or below grade. The vault 50 could be produced by excavating a suitable area or by building a free-standing structure above ground or floating on water. The system should be located so that solar energy has maximum exposure to the collection area based on overall yearly conditions and allowing for the output to be conveniently transferred to where it will be used. Scalability guarantees that no system would be too large or too small to produce an efficient output.

The solar energy conversion system functions by solar energy heats the bottom portion of the solar collector assembly section 12. Virtually all of the solar energy goes into heating the gas because nearly all of the area exposed to the solar energy is covered by high energy absorption materials. The heated structure heats the surrounding gas by convection. The heated gas rises through the segmented structure of the collector assembly solar energy collector 10, which in turn creates a low pressure zone in the vault 50 which draws ambient air through the inlet passages inlet passageways 20, and inlet passageways 30 completing the flow path. The total cross sectional footprint of the segmented flow structure and the height of each tube segment produces an optimized negative pressure gradient as a result of gas buoyancy. Being thermally close coupled insures a relatively balanced or gradually changing temperature profile across the collection area. The close-coupled nature of the vertical segment tubes creates a negative pressure similar to the "pull" of a large upward moving piston with a similar cross-sectional area.

The large negative pressure gradient area within the vault 50 draws in "make up" gas to replace the gas flowing out of the top of the solar energy collector 10. This replacement gas is fled through the, air passage inlet 20, and inlet passageways 30 that incorporate the output generating devices 75.

As long as there is a temperature differential between the heated gas in the collection area 10 and ambient gas temperature, buoyancy will drive air movement. Over the period of hours, days, weeks, etc., the heated surface within the collector will serve as energy storage and continue to drive gas flow until temperatures with ambient conditions are equalized.

In one embodiment it has been contemplated to utilize a series of baffles within the vault to alter the flow of air within, depending on the application and the placement of the inlet tubes, it may be desired to create a vortex-like flow or swirling action to improve efficiencies. Multiple Applications Vortex conditions (i.e. a "standing" vortex) as a result of swirling gas flow, may be incorporated into the system as a result of the independent nature of the collector area and the ability to add dynamically directional structure at the discharge area of the solar collection structure. Because each structure is relatively independent, changing the ratio of inflow area to outflow area in my system, would allow control of gas movement from maximum mechanical energy (i.e. velocity and pressure drop to drive a turbine) to maximum volumetric flow (i.e. CFM for drying or sequestration of a pollutant).

In one embodiment throttling mechanisms could be incorporated in each passageway to balance and optimize flow conditions for the targeted output. The output extraction device 75 can be internally combined with the flow chamber depending on the compactness and the output specified.

It is further contemplated to utilize a specialized secondary structures can be added to the system to improve the fluid dynamics amplifying velocity, liquid evaporation, liquid condensation, or gas sequestration. The complementary structures are positioned ahead of the intake; within the passageways, vault 50, gas flow segments: and in the discharge area after the flow segments. The combination of gas flow, elevated temperature, and fluid dynamics produces outputs of electrical power, pollution removal, potable water creation, drying, and ventilation, simultaneously or individually, as end products. The outputs are nearly linearly proportional to both the footprint area of the structure and the height of the individual flow segments. The cost of construction per unit output produced will go down with lower cost of purchasing a higher quantity of similar components. Labor cost for construction and servicing can be reduced by selecting individual components that can be handled easily.

Figure 4:
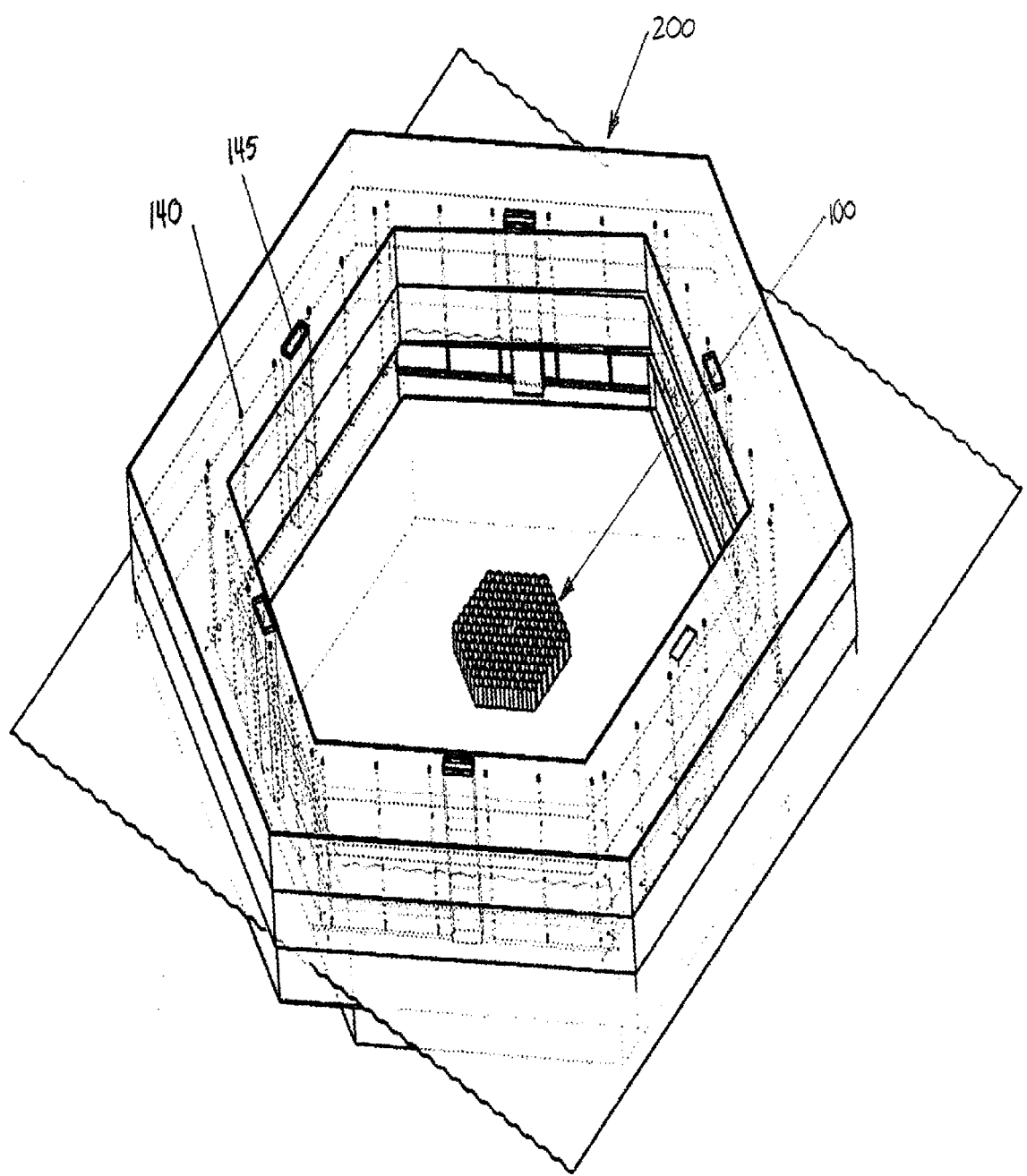
FIG. 4 is a perspective view of a low profile solar energy conversion system incorporated into a housing complex.

FIG. 4 is a perspective view of a low profile solar energy conversion system incorporated into a housing complex. In this instance the complex is a three story multiple unit dwelling that encircles the conversion system, but can readily be scale up or down, by decreasing or increasing the various components of the disclosed invention. Furthermore, the structure need not encircle the device and may include a variety of layouts and footprints.

Figure 5:
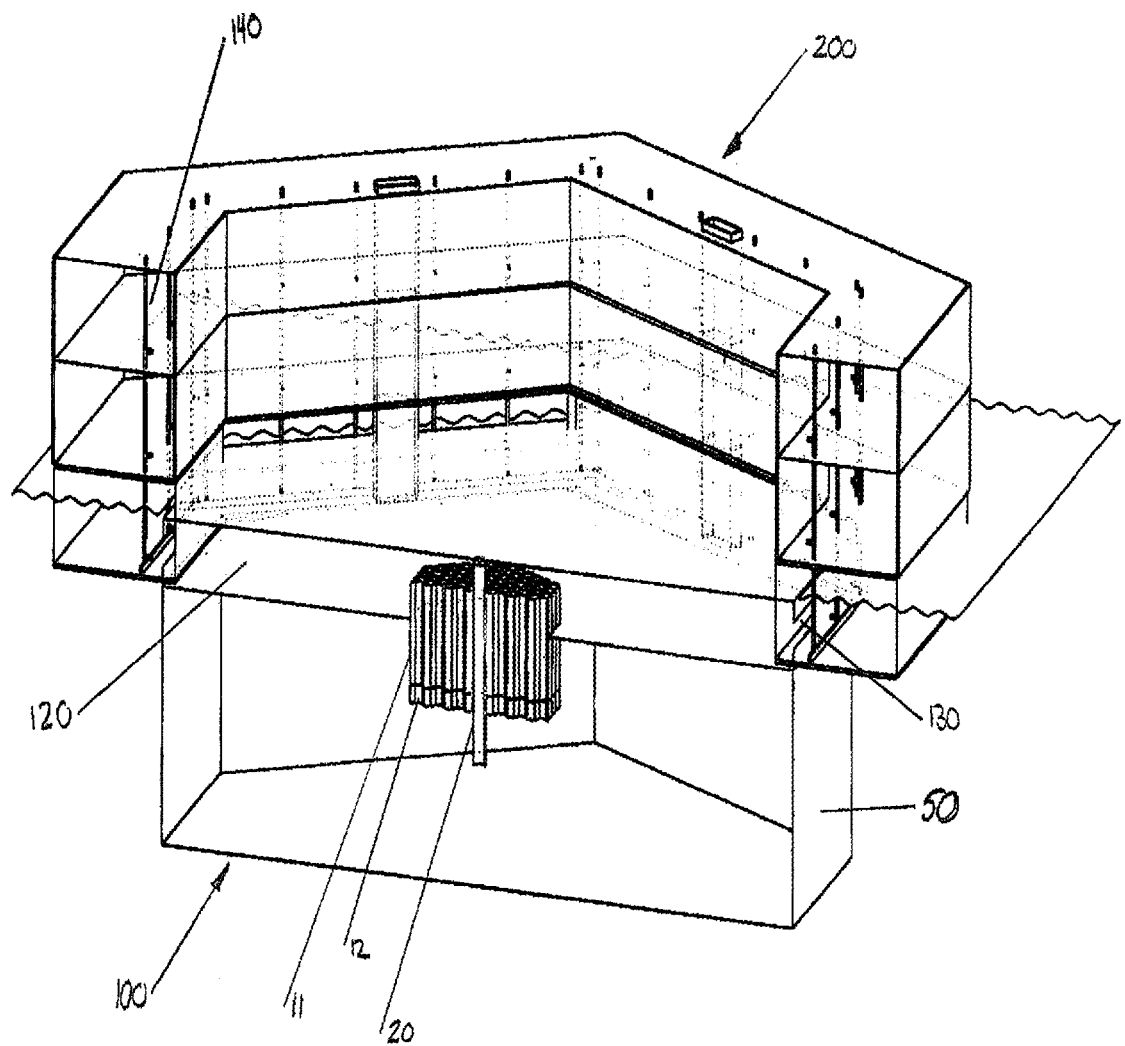
FIG. 5 is a cut-away perspective view of a low profile solar energy conversion system incorporated into a housing complex.

FIG. 5 is a cross sectional view of FIG. 4 and will allow for better understanding of the interaction of the low profile solar energy conversion system with an actual building. The building 200 in this embodiment is located above the low profile 10 energy converter 100 wherein the solar energy collector is essentially located in the center of the unit and has a heat storing chamber 120. This vault heat storage chamber 120 is a hollow box with a top, bottom, and walls which traps the rising air form the solar energy converter 100 and directs this air through a series of ducts 130, 140 and or vents 145 throughout the building similarly to that of traditional forced air IN AC units. Through a series of valves and controls it has been contemplated to reverse the cycle operation and use the heated air to induce a negative pressure drop to draw in colder ambient air into the building for cooling purposes.

The vault 50 has an interior open space containing air at ambient pressure encompassed and surrounded by a plurality of walls, a top and a bottom. The vault 50 can be as simple an excavated pit with an insulated roof or can be a concrete vault that may be partially used for storage such as water which would provide a thermal sink to produce a temperature gradient as well as to serve as a supplement for fire prevention activities. Nonetheless the solar collector is attached to and affixed to the solar collector 10 and allows air to pass from the vault 50 through the collector tubes upper and lower top and bottom sections 11,12 to fill the heat storage chamber 120. Make up air is drawn from the ambient external environment via the air passage inlet 20 penetrating the top of the vault 50 and the heat storage chamber 120 or in other embodiments the inlet tube penetrates a vault 50 wall to external environment.

The invention has been described in terms of the preferred embodiment. One skilled in the art will recognize that it would be possible to construct the elements of the present invention from a variety of means and to modify the placement of the components in a variety of ways. While the embodiments of the invention have been described in detail and shown in the accompanying drawings, it will be evident that various further modifications are possible without departing from the scope of the invention as set forth in the following claims:

What is claimed is:

1. A solar energy conversion system comprising:
   (a) a solar energy collector comprising of a plurality of vertically arranged hollow tubular structures tangentially attached to each other, wherein the longitudinal axis of each tubular structure is oriented vertically, each tubular structure comprising an upper section and a lower section, wherein the upper section is radiation transparent and the lower section is radiation absorbent;
   (b) a vault, located directly below and operatively connected to the solar energy collector, comprising an interior open space containing air that is encompassed and surrounded by a plurality of walls, a bottom, and a top further comprised by the vault, the top configured to allow the tubular structures of the solar energy collector to penetrate through the top and the top further configured to support the vertical orientation of the tubular structures, the tubular structures allowing air to pass from the vault through the tubular structures to the atmosphere; and
   (c) at least one inlet tube penetrating into the interior open space of the vault and operatively connected to the vault and the atmosphere so as to draw external air from the atmosphere into the vault, wherein the air that has entered the vault through the at least one inlet tube is heated by the solar energy collector with solar radiation and the air is subsequently released into the atmosphere by rising upward through the tubular structures of the solar energy collector.

2. The solar energy conversion system of claim 1, further comprising at least one output generating device, which may be a turbine, affixed to at least one inlet tube.

3. The solar energy conversion system of claim 1, wherein the tubular structures are hexagonally shaped.

4. The solar energy conversion system of claim 1, wherein the at least one inlet tube penetrates at least one of the walls.

5. The solar energy conversion system of claim 1, wherein the at least one inlet tube penetrates the top of the vault.

6. The solar energy conversion system of claim 3, wherein each hexagonally shaped tubular structure comprises six walls and the tubular structures are arranged together into a honeycomb configuration by adjoining the wall or walls of each tubular structure with the wall or walls of one or more tubular structures such that each additional tubular structure added to the honeycomb configuration, after adjoining two tubular structures together along a single wall of each, is adjoined to the other tubular structures, or to a single tubular structure and the at least one inlet tube, along at least two of its walls, wherein there is no gap between adjoining walls of the tubular structures.

7. The solar energy conversion system of claim 1 further comprising at least one one-way check valve located within a section of at least one of the hollow tubular structures so that air may flow in a singular direction up from the vault and out through the tubular structures.

8. The solar energy conversion system of claim 7 wherein the one-way check valve is thermally operated.

9. The solar energy conversion system of claim 7 wherein the one-way check valve is pressure operated.

10. The solar energy conversion system of claim 7 wherein the one-way check valve is electronically operated.

11. The solar energy conversion system of claim 5, further comprising a heat storage chamber operatively connected to and located directly above the solar energy collector, the heat storage chamber comprising a hollow box comprising a top, a bottom, and walls, the heat storage chamber configured to capture rising exiting air from a top of the hollow tubular structures of the solar energy collector, wherein the heated air captured in the heat storage chamber is released to atmosphere through at least one output generating device, which may be a turbine, operatively connected to the heat storage chamber; and wherein the at least one inlet tube passes through the heat storage chamber and the solar energy collector.

12. The solar energy conversion system of claim 1, wherein the vault comprises a subterranean concrete vault.

13. The solar energy conversion system of claim 1, wherein the vault comprises heat absorbent material.

14. The solar energy conversion system of claim 5, further comprising a heat storage chamber operatively connected to and located directly above the solar energy collector, the heat storage chamber comprising a hollow box comprising a top, a bottom, and walls, the heat storage chamber configured to capture rising exiting air from a top of the hollow tubular structures of the solar energy collector, wherein the at least one inlet tube passes through the heat storage chamber and the solar energy collector, and wherein the heated air captured in the heat storage chamber is operatively connected to a building configured for directing the heated air throughout the building as a part of a forced-air HVAC system for the building.

15. A solar energy conversion system comprising:
(a) a solar energy collector comprising of a plurality of vertically arranged hollow tubular structures tangentially attached to each other, wherein the longitudinal axis of each tubular structure is oriented vertically, each tubular structure comprising an upper section and a lower section, wherein the upper section is radiation transparent and the lower section is radiation absorbent;
(b) an insulated vault, located below and operatively connected to the solar energy collector, comprising an interior open space containing air that is encompassed and surrounded by a plurality of walls a bottom, and a top further comprised by the vault, the top configured to allow the tubular structures of the solar energy collector to penetrate through the top and the top further configured to support the vertical orientation of the tubular structures, the tubular structures allowing air to pass from the vault through the tubular structures to the atmosphere;
(c) at least one inlet tube penetrating into the interior open space of the vault through the top of the vault and operatively connected to the vault and the atmosphere, so as to enable passage of air from the atmosphere into the vault, wherein the air that has entered the vault through the at least one inlet tube is heated by the solar energy collector with solar radiation and the air is subsequently released back into the external environment through the solar energy collector in a direction from the lower section of the solar energy collector towards the upper section;
(d) a heat storage chamber operatively connected to and located directly above the solar energy collector, the heat storage chamber comprising a hollow box comprising a top, a bottom, and walls, the heat storage chamber configured to capture rising exiting air from a top of the hollow tubular structures of the solar energy collector, wherein the at least one inlet tube passes through the heat storage chamber and the solar energy collector;
(e) a building operatively connected to and located above the heat storage chamber; and
(f) a series of ducts or vents or chambers operatively connected between the heat storage chamber and the building that are configured to direct the heated exiting air from the heat storage chamber throughout the building.

* * * * *